US 11,401,957 B2

(12) United States Patent
Sadule

(10) Patent No.: US 11,401,957 B2
(45) Date of Patent: Aug. 2, 2022

(54) INTEGRATED GEAR PUMP IN REMOTE MOUNTED HYDRAULIC CONTROL UNIT

(71) Applicant: Eaton Intelligent Power Limited, Dublin (IE)

(72) Inventor: Shoaib D. Sadule, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/053,919

(22) PCT Filed: May 6, 2019

(86) PCT No.: PCT/EP2019/025138
§ 371 (c)(1),
(2) Date: Nov. 9, 2020

(87) PCT Pub. No.: WO2019/214851
PCT Pub. Date: Nov. 14, 2019

(65) Prior Publication Data
US 2021/0222763 A1 Jul. 22, 2021

(30) Foreign Application Priority Data
May 7, 2018 (IN) .............................. 201811017193

(51) Int. Cl.
*F15B 15/18* (2006.01)
*F04B 23/02* (2006.01)
(Continued)

(52) U.S. Cl.
CPC .............. *F15B 15/18* (2013.01); *F04B 17/03* (2013.01); *F04B 23/026* (2013.01); *F04B 39/14* (2013.01);
(Continued)

(58) Field of Classification Search
CPC ........ F04B 17/03; F04B 23/026; F04B 39/14; F15B 1/027; F15B 1/265; F15B 15/18;
(Continued)

(56) References Cited

U.S. PATENT DOCUMENTS 3,773,074 A * 11/1973 Miceli ................. F15B 13/0814
137/596
6,135,741 A * 10/2000 Oehman, Jr. ........... F04C 14/28
418/102
(Continued)

FOREIGN PATENT DOCUMENTS

JP H0911886 A 1/1997
JP 2014043243 A 3/2014

OTHER PUBLICATIONS

International Search Report and Written Opinion for PCT/EP2019/025138; dated Aug. 6, 2019; pp. 1-11.

*Primary Examiner* — Kenneth Bomberg
*Assistant Examiner* — Matthew Wiblin
(74) *Attorney, Agent, or Firm* — Mei & Mark, LLP

(57) ABSTRACT

A hydraulic control unit comprises a housing, an accumulator, a gear pump assembly, and a motor. The housing comprises an accumulator compartment, a gear pump compartment, and a flow path section connecting the gear pump compartment and the accumulator compartment, the flow path section comprising at least a supply path and a pressurizing path. The accumulator in the accumulator compartment comprises a movable piston dividing the accumulator compartment into a high pressure reservoir and a low pressure reservoir. A gear pump assembly is in the gear pump compartment. The gear pump assembly is configured to draw return fluid from the low pressure reservoir via the supply path and to pump pressurized fluid through the pressurizing path to accumulate in the high pressure reser-
(Continued)

voir. A motor assembly is connected to the gear pump compartment of the housing and is configured to power the gear pump assembly.

20 Claims, 5 Drawing Sheets

(51) Int. Cl.
*F16H 48/32* (2012.01)
*F04B 39/14* (2006.01)
*F15B 1/26* (2006.01)
*F04B 17/03* (2006.01)
*F15B 1/027* (2006.01)

(52) U.S. Cl.
CPC ............. *F15B 1/027* (2013.01); *F15B 1/265* (2013.01); *F16H 48/32* (2013.01); *F15B 2201/31* (2013.01); *F15B 2201/60* (2013.01)

(58) Field of Classification Search
CPC .. F15B 2201/31; F15B 2201/60; F16H 48/32; F16H 57/037
See application file for complete search history.

(56) References Cited

U.S. PATENT DOCUMENTS

| | | | |
|---|---|---|---|
| 6,979,185 B2 * | 12/2005 | Kaempe | ................. F04C 14/04 418/131 |
| 2004/0168434 A1 * | 9/2004 | Knapp | ................. F15B 11/0423 60/325 |
| 2009/0064674 A1 * | 3/2009 | Davidsson | ............ F15B 21/044 60/422 |
| 2013/0319813 A1 | 12/2013 | Otanez et al. | |
| 2016/0160982 A1 * | 6/2016 | Edler | ................... F04C 15/0023 418/61.3 |
| 2017/0045127 A1 * | 2/2017 | Fisher | ................... F16H 57/037 |

* cited by examiner

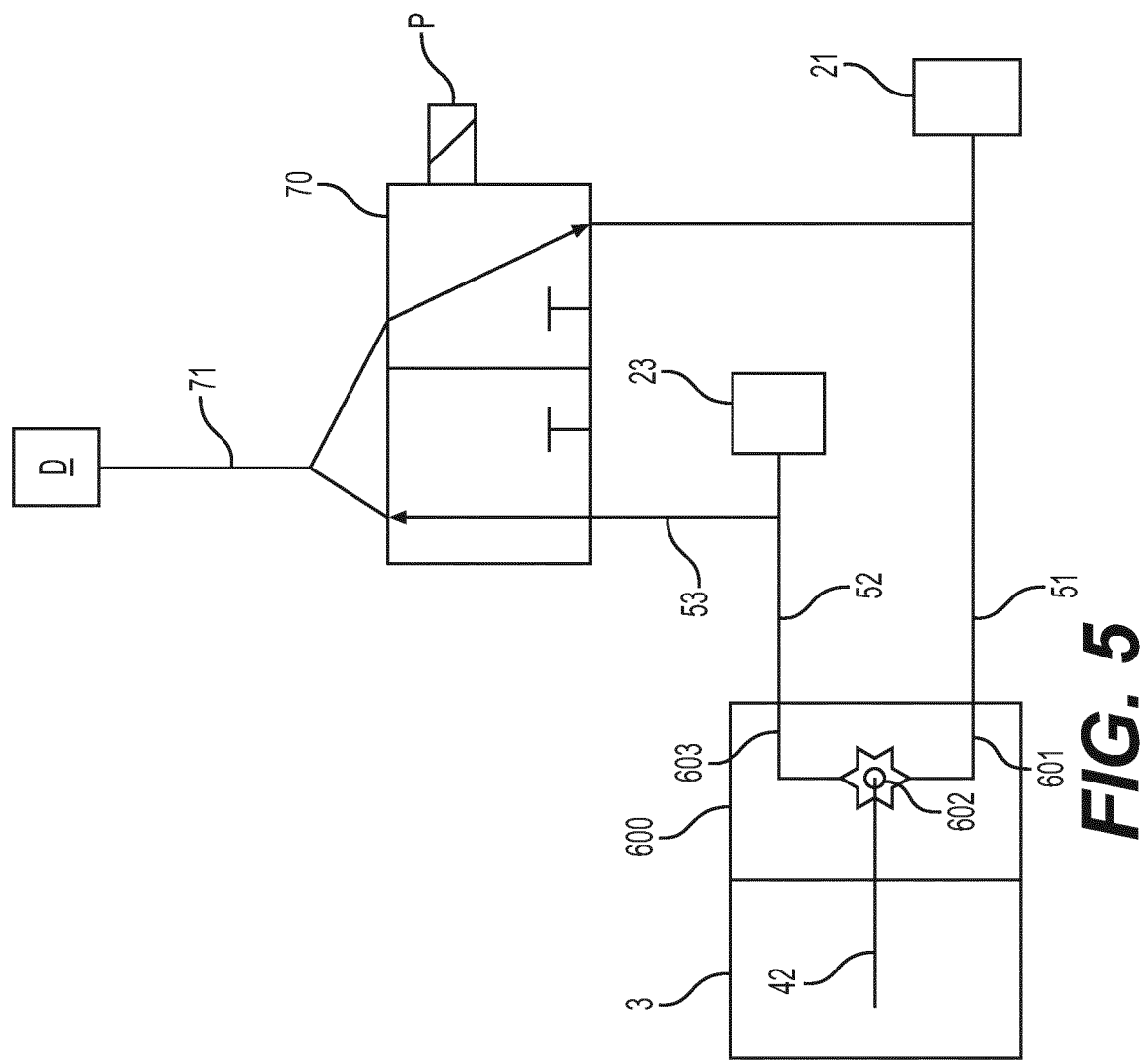

INTEGRATED GEAR PUMP IN REMOTE MOUNTED HYDRAULIC CONTROL UNIT

This is a § 371 National Stage entry of Patent Cooperation Treaty Application No. PCT/EP2019/025138, filed May 6, 2019, which claims the benefit of Indian provisional application number 201811017193, filed May 7, 2018, all of which are incorporated herein by reference and relied upon for the benefit of priority.

FIELD

This application provides an integrated gear pump in for use in a remote mounted hydraulic control unit. The integrated gear pump can be used to control a clutch such as in a limited slip differential.

BACKGROUND

Hydraulic control units and hydraulic control systems suffer from leakage and corrosion. Prior systems have many piecemeal connections that lead to fluid loss and pressure losses. Piecemeal systems also require more weight and cost to protect the pieces from corrosion, as by separate encasements.

Prior integrated solutions suffer from large size. For example, prior axial piston pumps in hydraulic control systems require a large size for the reciprocating axial piston and actuation mechanisms therefor.

SUMMARY

It is beneficial to devise integrated solutions that minimize encasement redundancies while achieving a small size total package. This lightweights and minimizes material use. It also minimizes leak paths.

A hydraulic control unit comprises a housing, an accumulator, a gear pump assembly, and a motor. The housing comprises an accumulator compartment, a gear pump compartment, and a flow path section connecting the gear pump compartment and the accumulator compartment, the flow path section comprising at least a supply path and a pressurizing path. The accumulator in the accumulator compartment comprises a movable piston dividing the accumulator compartment into a high pressure reservoir and a low pressure reservoir. A gear pump assembly is in the gear pump compartment. The gear pump assembly is configured to draw return fluid from the low pressure reservoir via the supply path and to pump pressurized fluid through the pressurizing path to accumulate in the high pressure reservoir. A motor assembly is connected to the gear pump compartment of the housing. The motor assembly is configured to power the gear pump assembly.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIG. 5 is a schematic of a flow path of a hydraulically controlled system comprising the hydraulic control unit.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

The application provides an integrated design of a hydraulic control unit ("HCU") 1 with a gear pump assembly 600 for an eLSD (electronically controlled limited slip differential) application. The HCU housing 2 is so designed to accommodate a gear pump assembly 600 to integrate the gear pump assembly 600 inside the HCU 1. This design is cost efficient, limits leakage, and also protects the gear pump assembly 600 from exposure to outside elements.

Figure 1:
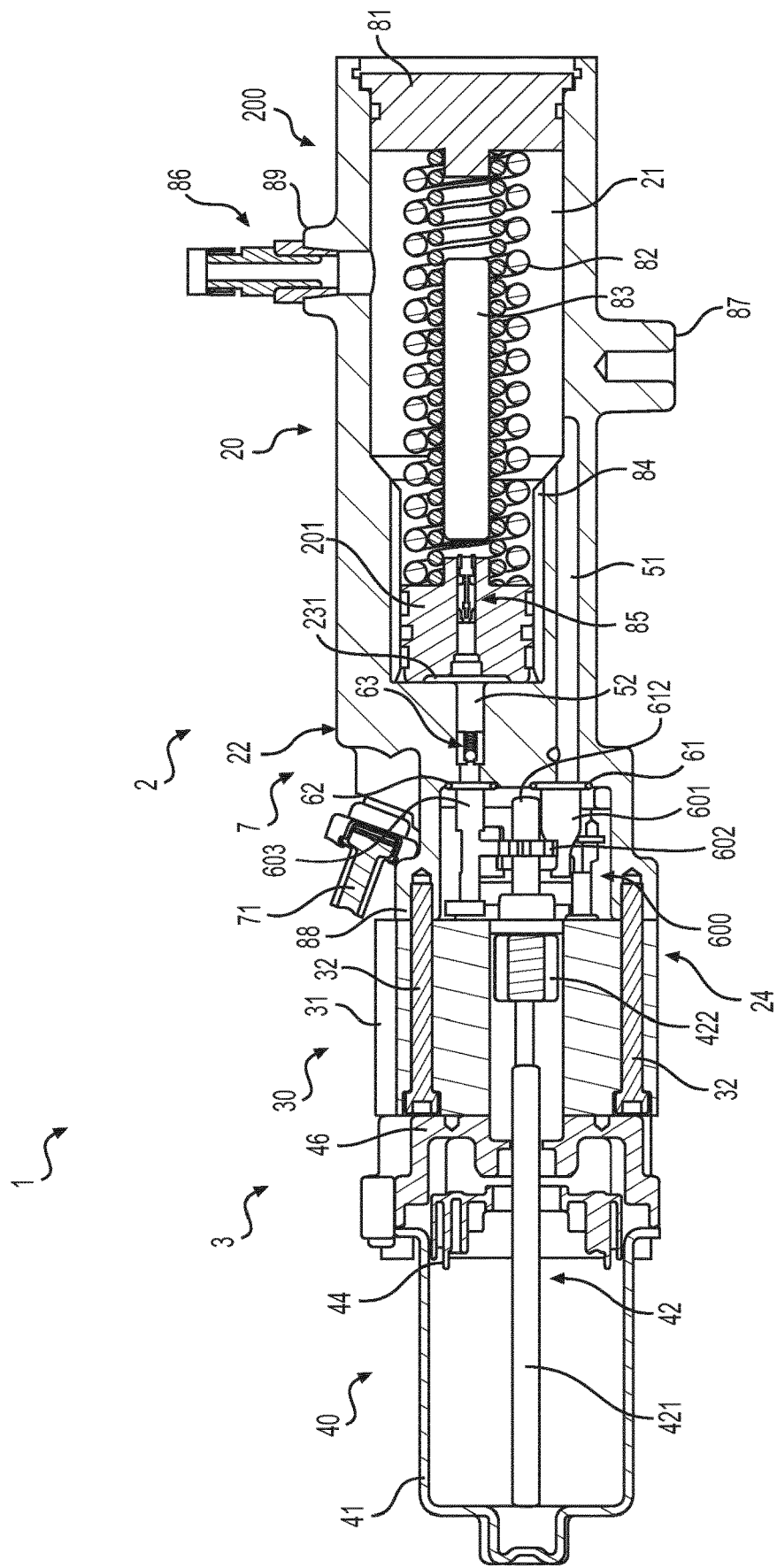
FIG. 1 is a cross section view of an integrated hydraulic control unit.
Figure 2:
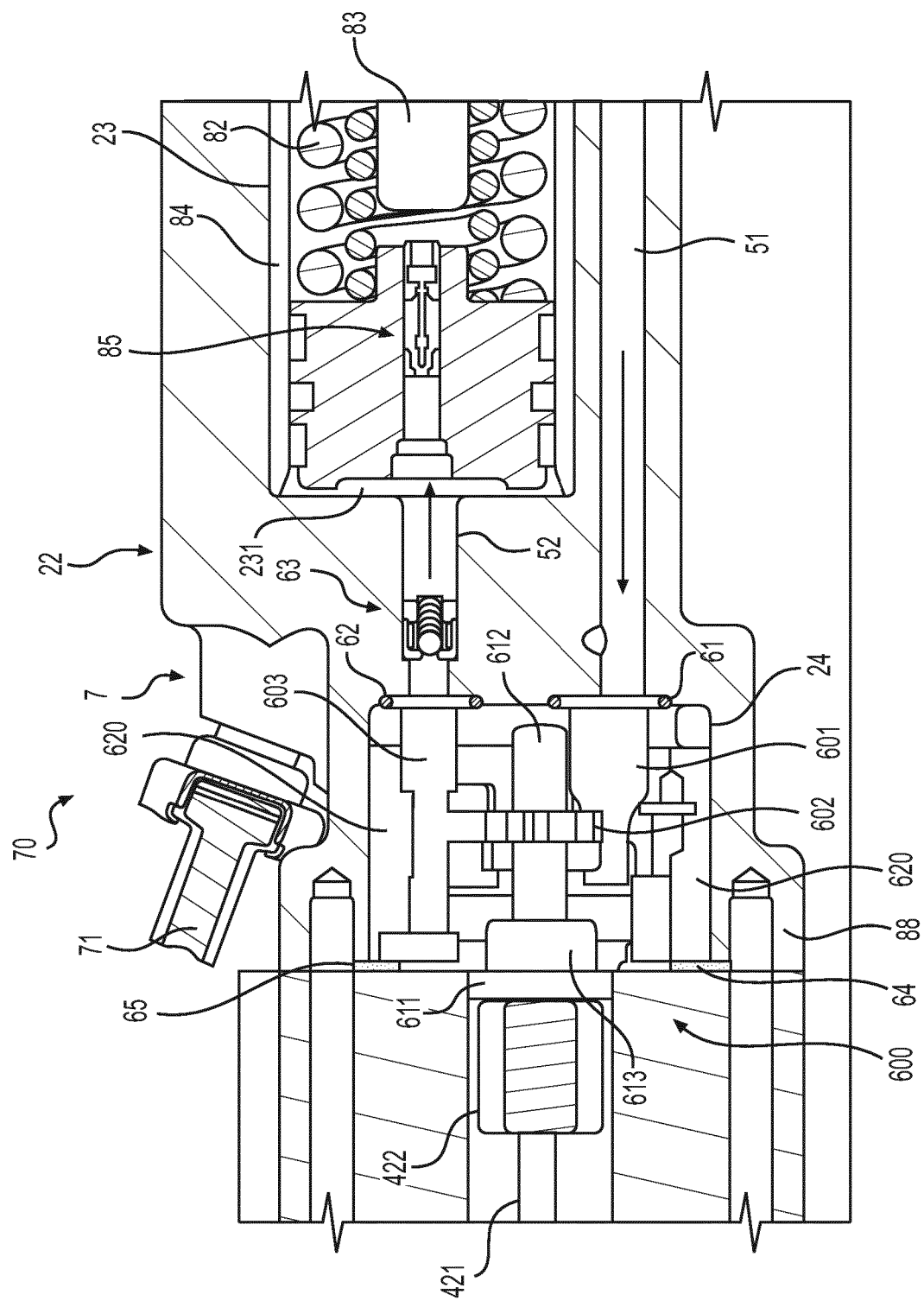
FIGS. 2-4 are views flow paths in the hydraulic control unit.
Figure 3:
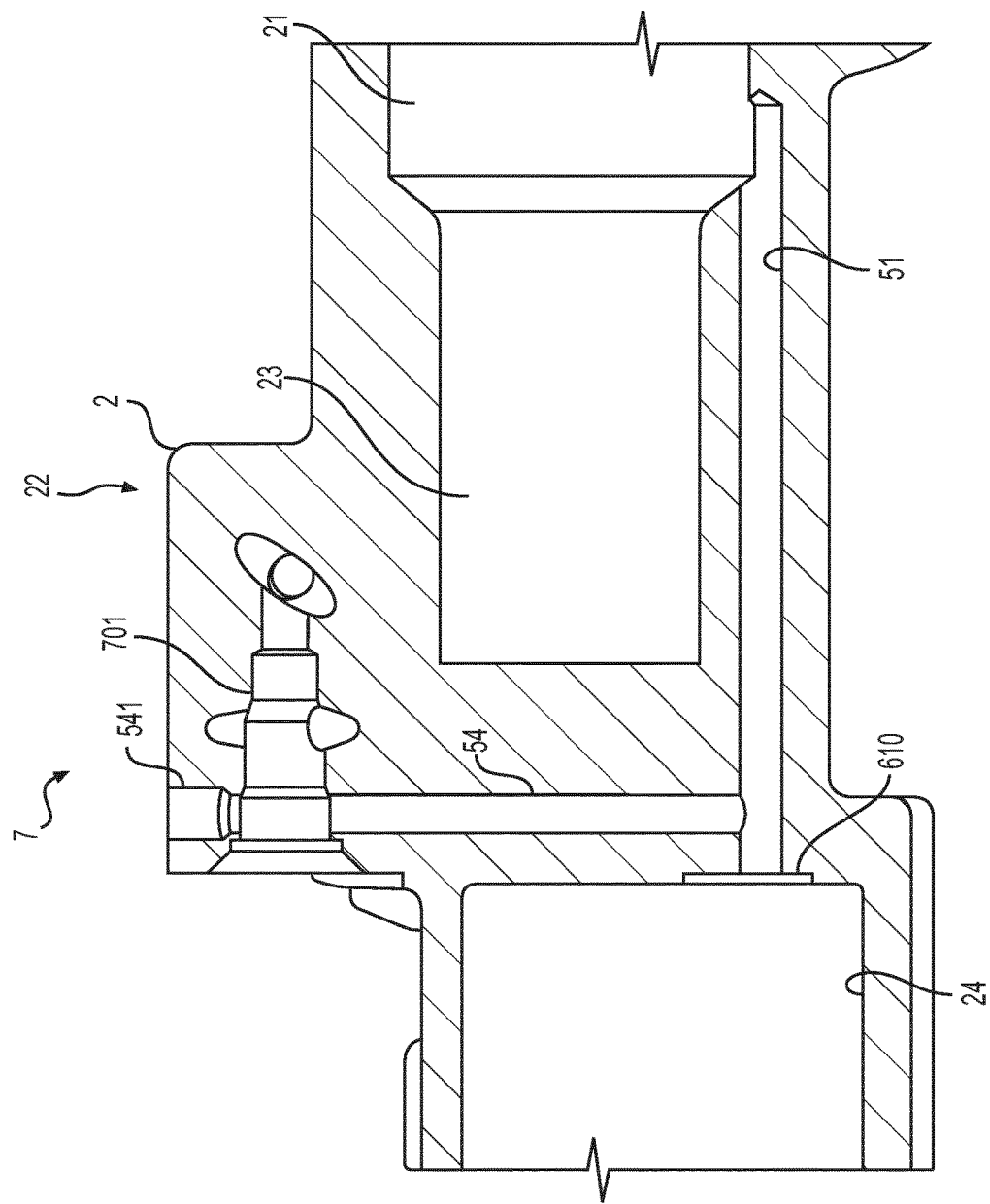
Figure 4:
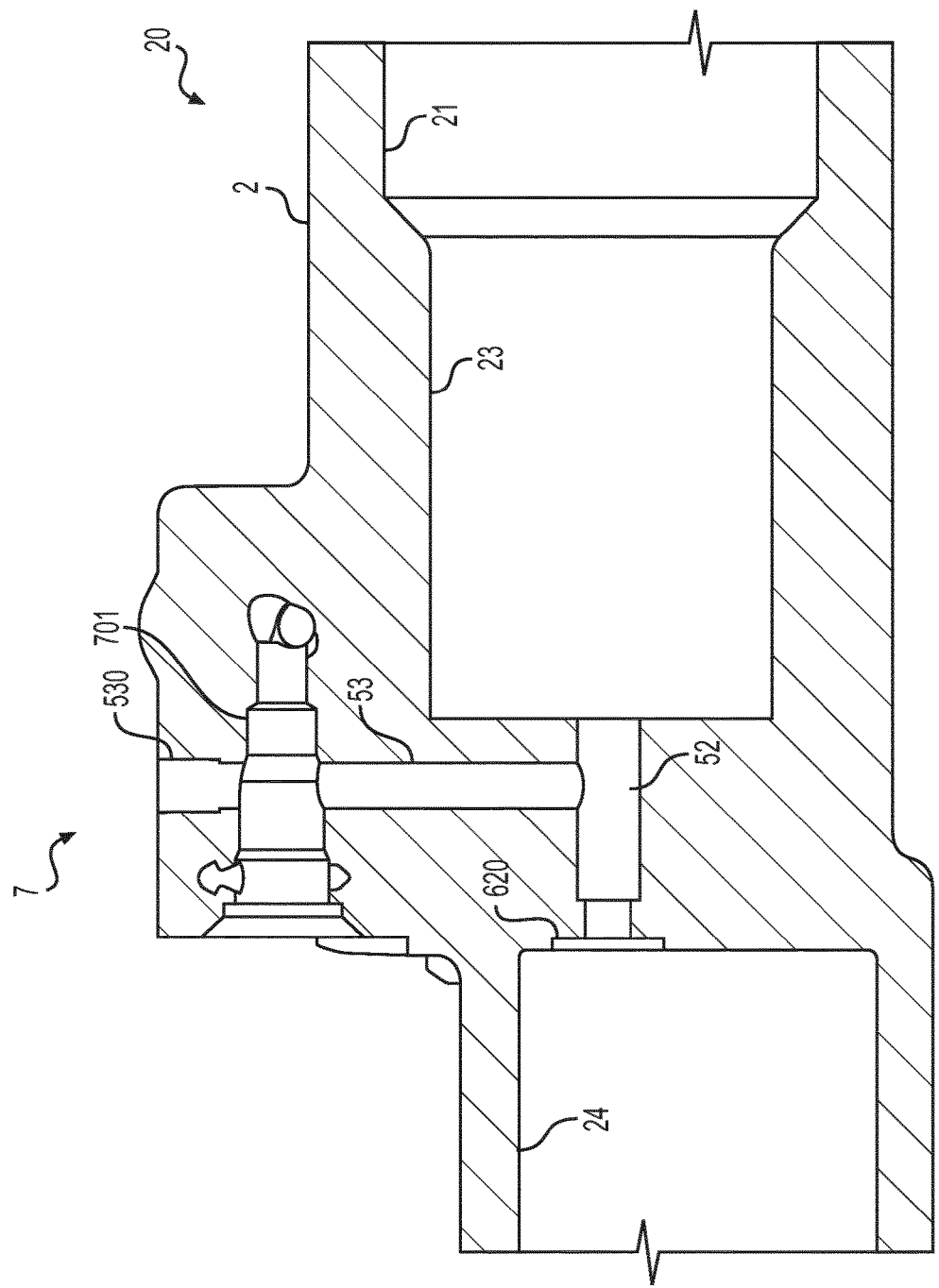

FIGS. 1 & 2 are cross-section views along the same plane. FIG. 3 is a cross-section view along a plane showing the low pressure fluid pathways. FIG. 4 is a cross-section view along a plane showing the high pressure fluid pathways. A device path 71 provides a fluid flow plenum pathway to and from a plenum of a hydraulically controlled device D. The hydraulic control circuit is shown in schematic in FIG. 5 and can comprise a variety of porting and pathway options from valve compartment 701 to device D, and device path 71 can comprise such as tubing, drilling, casting, among others.

A hydraulic control unit 1 can comprise a housing 2, an accumulator 200, a gear pump assembly 600, and a motor assembly 3 as an integrated unit. The integrated unit minimizes fluid leaking and maximizes space-savings.

Housing 2 can comprise an accumulator compartment 22, a gear pump compartment 24, and a flow path section 22 connecting the gear pump compartment 24 and the accumulator compartment 20. Housing can comprise such as mounting lugs 87, vent port 89 for a reservoir vent 86, and fixing points 88 for receiving mounting bolts 32 or the like. The housing can be an integrally formed piece, as by casting, molding, printing, among others. Drilling or tooling or the like can be used to form the compartments and paths, as appropriate.

The flow path section 22 is formed within the housing 2. At least a supply path 51 and a pressurizing path 52 are formed in the flow path section 22. Additional formations in the flow path section 22 can comprise a control flow path 53 connected to the pressurizing path 52 and a return flow path 54 connected to supply path 51. Control flow path 53 connects to the pressurizing path 52 in the flow path section 22. Control flow path 53 is connected to supply pressurized fluid to the three-way valve 70. A return flow path 54 is connected to the supply path 51 in the flow path section 22. The return flow path 54 is connected to receive fluid returning through the three-way valve 70. The layout of the control flow path 53 and return flow path 54 with respect to the supply path 51 and the pressurizing path 52 maximizes efficiency of space in the flow path section 22. The intersection of supply path 51 with return flow path 54, and the intersection of control flow path 53 with pressurizing path 52 contribute to this efficiency of space.

Additional features in the flow path section 22 can comprise an optional one-way valve 63 to trap pressurized fluid in the accumulation zone 231 and to prevent backwards leaking through the gear pump assembly 600. Plug zones 530 & 541 can be formed to receive plugs to plug ends of the control flow path 53 and return flow path 54, respectively. Glands 610, 620 can be formed at ends of the supply path 51 and pressurizing path 52 to receive o-rings 61, 62 or other sealing structures or layers to create a fluid-tight seal of the supply path 51 and the pressurizing path 52 against the gear pump assembly 600.

Accumulator 200 is in the accumulator compartment 20 of housing 2. The accumulator 200 comprises a movable piston 201 dividing the accumulator compartment 20 into a high pressure reservoir 23 and a low pressure reservoir 21. An overpressure valve 85 can be included in the movable piston 201. Glands for seals, such as wiper seals, quad seals, or o-rings, can be included on the perimeter of the movable piston 201 to seal the high pressure reservoir 23 from the low pressure reservoir 21. The seals of the movable piston 201 can directly abut the interior wall of the high pressure reservoir 23, or a sheath 84 can be inserted to abut the perimeter of the high pressure reservoir 23 on the outside of the sheath 84 and to contain and seal against the movable piston 201 on an interior of the sheath 84.

Movable piston 201 is moved by high pressure when pressurized fluid accumulates in the accumulation zone 231. A recess can be formed in the movable piston 201 to receive the pressurized fluid and to overcome stiction. A reservoir lid 81 can be connected to seal the accumulator compartment 20. At least one spring 82 can be biased against the reservoir lid 81 to bias the movable piston 201 to collapse an accumulation zone 231 in the high pressure reservoir 23. Biasing the movable piston 201 in this way can comprise guide posts on the reservoir lid and movable piston 201 for guiding ends of the at least one spring 82. Two springs can be arranged one inside the other and can comprise different pitches and wire diameters. A limiter 83 can be set within the inner spring to limit the travel of the movable piston 201.

Gear pump assembly 600 is drop-in assembled into the gear pump compartment 24. This isolates the gear pump assembly 600 from corrosion and limits leaking out of the hydraulic control circuit. The housing 2 can be of a high corrosion resistance while the gear pump assembly housing 620 is of a lighter material or relatively lighter corrosion resistance. The gear pump assembly 600 is configured as shown by the arrows in FIG. 2 to draw return fluid from the low pressure reservoir 21 via the supply path 51 and to pump pressurized fluid through the pressurizing path 52 to accumulate in the accumulation zone 231 of the high pressure reservoir 23.

The gear pump assembly 600 comprises one or more rotatable gear 602. The rotatable gear or gears can be mounted on a rotatable axle 612 set within the gear pump assembly housing 620. An axle mount 613 can be set in the cap of the gear pump assembly housing 620 to guide the rotatable axle 612 and to receive rotation forces from the motor. The axle mount 613 can protrude through the cap of the gear pump assembly housing. Additional plugs can be included to form internal compartments such as inlet area 601 and outlet area 603 for the pumped fluid. These internal compartments can be stepped or shaped for flow and pressure control. The gear pump assembly 600 can connect an inlet area 601 to the supply path 51 and can connect an outlet area 603 to the pressurized path 52. The one or more rotatable gear 602 pumps return fluid from the inlet area 601 to become pressurized fluid in the outlet area 603.

Axle mount 613 in the cap of the gear pump assembly housing 620 can align with a positioning neck 611 outside the fluid-holding internal compartments. Positioning neck 611 can assist with positioning the coupler head 422 with respect to the axle mount 613. A male to female coupling arrangement, a tongue and groove coupling arrangement, a snap or clip coupling arrangement, or the like, can be used to connect the coupler head 422 to the axle mount 613.

Motor assembly 3 is connected to the gear pump compartment 24 of the housing 2. Motor assembly is configured to power the gear pump assembly 600. Motor assembly 3 comprises a powered assembly 40 for powering the rotation of coupler 42. Coupler 42 comprises a drive shaft 421 and coupler head 421 connected to drive the one or more gears 602 of gear pump assembly 600.

Some standard aspects of motor assembly 3 are omitted for clarity of the figures, including the coil assembly for forming a rotor and stator within the motor housing 41. A rotatable cup 44 is shown surrounding the drive shaft 421, the rotatable cup 44 delimiting the zone for the rotor and stator assemblies.

Motor assembly 3 can comprise the active power portion 40 and a positioning portion comprising a surface plate assembly 30. Surface plate assembly 30 can be included when the coupler 42 projects out of the active power portion 40 a distance that requires a stability and protective element. Positioning portion formed by surface plate assembly 30 provides room for the axle mount 613 to project out of the gear pump assembly 600 and provides room for the coupler head 422 to connect to the axle mount 613 without intruding into the active power portion 40 of the motor assembly. A mounting plate 46 can be included on the terminus of the active power portion 40 to position it with respect to the surface plate assembly 30. Coupling bolts 32 through the surface plate body 31 and into mounting zones 88 of the housing 2 can position the surface plate assembly 30 with respect to the gear pump assembly 600. Additional bolts can secure active power portion 40 to the surface plate body 31. Fixtures other than bolts can be used, such as clips, clamps, welds, epoxies, coatings, among others. The structure of motor assembly 3 comprising a surface plate assembly 30 positions the coupler 42 with respect to the gear pump assembly 600. Surface plate assembly 30 can be omitted when the active power portion 40 is designed with an integral positioning portion. Length of coupler 42 can be shortened to facilitate such integration of the positioning portion.

As above, the gear pump assembly 600 is assembled inside the hydraulic control unit 1 to protect against corrosion and leaking. To further foster leak protection, the supply path 51 can be sealed to the gear pump assembly 600 via a first seal 61. The pressurizing path 52 can be sealed to the gear pump assembly 600 via a second seal 62. Fluid tight transfer from the supply path 51 to the inlet area 601 and from the outlet area 603 to the pressurizing path 52 can be assured. Further fluid-tight sealing is accomplished by using the motor assembly 3 to seal the gear pump assembly 600 within the gear pump compartment 24. The motor assembly 3 can be connected to the gear pump compartment with a layer of sealant 64, 65 or with a seal or gasket arrangement.

The housing 2 of hydraulic control unit further comprises a valve hub 7 comprising a valve compartment 701 connected to the flow path section 22. Valve compartment 701 can be configured to seat a three-way valve 70. While a two-position three-way valve is shown in FIG. 5, the disclosure is not limited to only the depicted arrangement as numerous equivalents are interchangeable and exist in the art. Three-way valve 70 can be controlled by, for example, a power device P, such as a solenoid acting on a spool. Numerous alternatives exist such that mechanical or electromechanical substitutes are within ordinary skill to substitute for three-way valve 70. In a first position, the three-way valve permits flow of pressurized fluid out of the accumulation zone 231 and to the downstream device D. In a second position, the three-way valve permits flow of return fluid back to low pressure reservoir 21. Another position can be included on the three-way valve to hold fluid in the downstream device, as by blocking both control flow path 53 and return flow path 54.

The three-way valve 70 in the valve compartment 701 is connected to a device path 71 to hydraulically control a downstream device D. For example, a piston in a plenum can be moved to activate the downstream device, such as a clutch pack, by supplying pressurized fluid through the three-way valve 70. The three-way valve is controllable to receive pressurized fluid from the control flow path 53 and direct the pressurized fluid to the hydraulically-controlled device via the device path 71. The three-way valve is further controllable to receive return fluid from the hydraulically-controlled device D and direct the return fluid to the return flow path 54. The same device path 71 can supply pressurized fluid to the downstream device and can alleviate pressurized fluid for deactivating the downstream device.

To feed the inlet area 601 of the gear pump assembly 600, a low pressure fluid reservoir 21 is formed behind the movable piston 201 of accumulator 200, in the spring-end of the housing 2. The accumulator casing, comprised of the housing 2, can comprise a first low pressure fluid pathway (supply path 51) from the low pressure fluid reservoir 21 to a pocket (gear pump compartment 24) for receiving the gear pump assembly 600. The inlet port to the inlet area 601 of the gear pump assembly 600 can be in-line with the outlet port of the outlet area 603. An additional low pressure fluid pathway (return path 54) can be included between the first low pressure fluid pathway (supply path 51) and an actuatable (controllable) 3-way valve that directs fluid to a hydraulically-controlled down stream device D. A plenum of a differential is an example of a hydraulically-controlled down stream device D. A clutch plenum can comprise an aspect of a hydraulically-controlled down stream device D. A limited slip differential can have its slip controlled by controlling the pressure supplied to the plenum.

To pressurize the plenum, the gear pump assembly 600 draws fluid from the spring-end of the accumulator 200 comprised of the low pressure reservoir 21 and then the gear pump assembly 600 outputs the fluid to the piston end of the accumulator 200 comprised of the accumulation zone 231 forming a high pressure reservoir. A check ball or other check valve feature can be included in a first high pressure fluid pathway. A second high pressure fluid pathway comprised of the control flow path 53 can connect the first high pressure fluid pathway to the 3-way valve for connection to the plenum. A sensor can be included to track the pressure, temperature or other characteristics of the fluid in the second high pressure fluid pathway even as by pass-through through the three-way valve. A control device can be included to actuate the 3-way valve between the low pressure and high pressure fluid pathways, with a third way of the 3-way valve connected to a plenum pathway to the plenum.

Other implementations will be apparent to those skilled in the art from consideration of the specification and practice of the examples disclosed herein.

What is claimed is:

1. A hydraulic control unit, comprising:
a housing, comprising an accumulator compartment, a gear pump compartment, and a flow path section connecting the gear pump compartment and the accumulator compartment, the flow path section comprising at least a supply path and a pressurizing path that is parallel to the supply path;
an accumulator in the accumulator compartment, the accumulator comprising a movable piston dividing the accumulator compartment into a high pressure reservoir and a low pressure reservoir;
a gear pump assembly in the gear pump compartment, the gear pump assembly comprising an inlet area in-line with an outlet area, the gear pump assembly configured to draw return fluid from the low pressure reservoir into the inlet area via the supply path and to pump pressurized fluid through the outlet area to the pressurizing path to accumulate in the high pressure reservoir; and
a motor assembly connected to the gear pump compartment of the housing, the motor assembly configured to power the gear pump assembly.

2. The hydraulic control unit of claim 1, where the motor assembly comprises a powered assembly for powering the rotation of a coupler, the coupler connected to drive the gear pump assembly.

3. The hydraulic control unit of claim 2, where the motor assembly further comprises a surface plate assembly for positioning the coupler with respect to the gear pump assembly.

4. The hydraulic control unit of claim 1, wherein the gear pump assembly is drop-in assembled to the gear pump compartment.

5. The hydraulic control unit of claim 4, wherein:
the supply path is sealed to the gear pump assembly via a first seal; and
the pressurizing path is sealed to the gear pump assembly via a second seal.

6. The hydraulic control unit of claim 4, wherein the motor assembly seals the gear pump assembly within the gear pump compartment.

7. The hydraulic control unit of claim 6, wherein the motor assembly is connected to the gear pump compartment with a layer of sealant or with a seal.

8. The hydraulic control unit of claim 1, wherein the gear pump assembly comprises one or more rotatable gear.

9. The hydraulic control unit of claim 8, wherein the gear pump assembly connects the inlet area to the supply path and connects the outlet area to the pressurized path, and wherein the one or more rotatable gear pumps return fluid from the inlet area to become the pressurized fluid in the outlet area.

10. The hydraulic control unit of claim 1, wherein the housing further comprises a valve hub comprising a valve compartment connected to the flow path section, and wherein the valve compartment is configured to seat a three-way valve.

11. The hydraulic control unit of claim 10, further comprising a control flow path connected to the pressurizing path in the flow path section, the control flow path connected to supply pressurized fluid to the three-way valve.

12. The hydraulic control unit of claim 11, further comprising a return flow path connected to the supply path in the flow path section, the return flow path connected to receive return fluid returning through the three-way valve.

13. The hydraulic control unit of claim 12, further comprising the three-way valve in the valve compartment, the three-way valve connected to a device path, the three-way valve controllable to receive the pressurized fluid from the control flow path and to direct the pressurized fluid to a hydraulically-controlled device via the device path, and the three-way valve is further controllable to receive the return fluid from the hydraulically-controlled device and to direct the return fluid to the return flow path.

14. The hydraulic control unit of claim 1, further comprising a reservoir lid connected to seal the accumulator compartment.

15. The hydraulic control unit of claim 14, further comprising at least one spring biased against the reservoir lid to bias the movable piston to collapse an accumulation zone in the high pressure reservoir.

16. A hydraulic control unit, comprising:
a housing, comprising an accumulator compartment, a gear pump compartment, and a flow path section connecting the gear pump compartment and the accumulator compartment, the flow path section comprising at least a supply path and a pressurizing path, wherein the supply path is parallel to the pressurizing path;
an accumulator in the accumulator compartment;
a gear pump assembly in the gear pump compartment, the gear pump assembly configured to draw return fluid via the supply path and to pump pressurized fluid through the pressurizing path; and
a valve compartment connected to the flow path section via a control flow path, wherein the control flow path intersects the pressurizing path.

17. The hydraulic control unit of claim 11, wherein the control flow path is connected to the pressurizing path.

18. The hydraulic control unit of claim 17, further comprising a return flow path connected to the supply path in the flow path section, wherein the return flow path is connected to receive fluid returning through the control flow path.

19. The hydraulic control unit of claim 16, wherein the valve compartment is positioned in the housing between the gear pump assembly and the accumulator.

20. A hydraulic control unit, comprising:
a housing, comprising an accumulator compartment, a gear pump compartment, and a flow path section connecting the gear pump compartment and the accumulator compartment, the flow path section comprising at least a supply path and a pressurizing path;
an accumulator in the accumulator compartment;
a gear pump assembly in the gear pump compartment, the gear pump assembly configured to draw return fluid via the supply path and to pump pressurized fluid through the pressurizing path; and
a controllable three-way valve in a valve compartment connected to the flow path section via a control flow path, the three-way valve connected to a device path, the three-way valve configured to switch between a first position to receive the pressurized fluid from the control flow path and to direct the pressurized fluid to a hydraulically-controlled device via the device path, and a second position to receive the return fluid from the hydraulically-controlled device and to direct the return fluid to the supply path via a return flow path,
wherein the supply path intersects the return flow path, and
wherein the control flow path intersects the pressurizing path.

\* \* \* \* \*